United States Patent [19]
Lee et al.

[11] Patent Number: 5,815,734
[45] Date of Patent: Sep. 29, 1998

[54] SYSTEM AND METHOD FOR RECONFIGURING CONFIGURATION REGISTERS OF A PCI BUS DEVICE IN RESPONSE TO A CHANGE IN CLOCK SIGNAL FREQUENCY

[75] Inventors: Sherman Lee, Rancho Palos Verdes, Calif.; Michael T. Wisor, Austin, Tex.

[73] Assignee: Advanced Micro Devices, Inc., Sunnyvale, Calif.

[21] Appl. No.: 868,797

[22] Filed: Jun. 4, 1997

Related U.S. Application Data

[62] Division of Ser. No. 308,151, Sep. 19, 1994, Pat. No. 5,678,065.

[51] Int. Cl.⁶ .............................. G06F 13/00; G06F 13/38
[52] U.S. Cl. ............................ 395/880; 395/556; 395/284
[58] Field of Search ............................... 398/750.04, 310, 398/280, 560, 559, 556, 880, 284, 309

[56] References Cited

U.S. PATENT DOCUMENTS

| | | |
|---|---|---|
| 4,464,772 | 8/1984 | Buckley et al. . |
| 5,086,387 | 2/1992 | Arroyo et al. ........................ 395/556 |
| 5,167,024 | 11/1992 | Smith et al. . |
| 5,263,172 | 11/1993 | Olnowich . |
| 5,309,568 | 5/1994 | Ghosh et al. . |
| 5,315,706 | 5/1994 | Thomson et al. ...................... 395/285 |
| 5,327,121 | 7/1994 | Antles, II . |
| 5,392,422 | 2/1995 | Hoel et al. . |
| 5,404,462 | 4/1995 | Datwyler et al. . |
| 5,471,587 | 11/1995 | Fernando . |
| 5,493,684 | 2/1996 | Gephardt et al. . |
| 5,511,013 | 4/1996 | Tokieda et al. . |
| 5,628,019 | 5/1997 | O'Brien ............................ 395/750.04 |
| 5,630,148 | 5/1997 | Norris ............................... 395/750.04 |

FOREIGN PATENT DOCUMENTS

| | | |
|---|---|---|
| 0 453 199 A2 | 10/1991 | European Pat. Off. . |
| 0 613 074 A1 | 8/1994 | European Pat. Off. . |

OTHER PUBLICATIONS

Bailey, Michael, "PCI Local Bus Breaks Data Bottleneck To Open Up PC Technology," Computer Technology Review, Sep. 12, 1993, No. 11, Los Angeles, CA, US, pp. 15–17.
PCI Local Bus, Chapter 7, 66 MHz PCI Specification, Revision 2.1, pp. 171–184.
European Search Report for Application No. 95305759.3, dated Nov. 16, 1995.

*Primary Examiner*—Gopal C. Ray
*Attorney, Agent, or Firm*—B. Noel Kivlin; Conley, Rose & Tayon

[57] ABSTRACT

A system is described for facilitating operation of a peripheral bus, such as a PCI bus, at a higher clock frequency. Each of the devices resident on the PCI bus include certain configuration registers, including MIN_GNT and MAX_LAT, which provide configuration parameters to various system resources. In addition, each of the devices resident on the PCI bus include a status register with a dedicated 66 MHzCAPABLE bit. The dedicated status bit indicates whether the PCI device is capable of operating in a 66 MHz environment. As a result, each device can be polled during system initialization to determine if all of the PCI devices will support 66 MHz operation. If the system determines that the clock frequency will change due to a change in the system configuration (such as PCI devices being added or removed from the PCI bus), the configuration registers of each of the PCI devices can be modified to insure proper operation at the new clock frequency.

14 Claims, 4 Drawing Sheets

SYSTEM AND METHOD FOR RECONFIGURING CONFIGURATION REGISTERS OF A PCI BUS DEVICE IN RESPONSE TO A CHANGE IN CLOCK SIGNAL FREQUENCY

This is a division of application Ser. No. 08/308,151 filed Sep. 19, 1994, now U.S. Pat. No. 5,678,065.

BACKGROUND OF THE INVENTION

1. Field of the Invention

The present invention relates generally to a system for supporting a high speed peripheral bus. More particularly, the present invention relates to a system which checks the compatibility of peripheral components with respect to the operating frequency of the peripheral bus clock. Still more particularly, the present invention relates to a system which determines whether operating parameters of peripheral bus components must be changed based upon a change in the peripheral bus clock frequency.

2. Description of the Relevant Art

FIG. 1 is a block diagram that illustrates a computer system 10 including a microprocessor (CPU) 12, a system memory 14, a bridge/memory controller 16, and a bus interface unit 18. A CPU local bus 20 couples the microprocessor 12 to bridge/memory controller 16 and bus interface and arbiter unit 18. A system memory bus 22 couples system memory 14 to bridge/memory controller 16. A first peripheral device 26 and a second peripheral device 28 are coupled to the bus interface unit 18 through a peripheral bus 30.

The peripheral bus 30 may comprise a high performance PCI bus capable of supporting a plurality of PCI master and devices. Thus, the peripheral device 26 may comprise a PCI Master controller that is capable of asserting ownership of the PCI bus during PCI Master cycles. The PCI master device 26 may comprise a local area network (LAN) device that connects other computer systems to peripheral bus 30, or could be embodied by an expansion bus interface that connects peripheral bus 30 to other peripheral buses. A second peripheral device 28 also is shown coupled to the peripheral bus 30. Peripheral device 28 may comprise a PCI slave device, such as a disk controller device or an audio controller device, for example.

The microprocessor 12 shown in FIG. 1 may comprise a model 80486 microprocessor, and the CPU local bus 20 could comprise an 80486-style local bus. Other style microprocessors and/or local bus architectures may be used without departing from the principles of the present invention. Details regarding the various bus cycles and protocols of the 80486 CPU local bus 20 are not discussed in detail herein, as they are well known by those in the art, and are available in numerous publications. CPU 12, memory controller 16 and PCI bus interface unit 18 have traditionally been fabricated on separate integrated circuit chips. A recent trend in computer systems has developed, however, in which the CPU core is combined with a variety of peripheral devices on a single integrated processor chip. An exemplary integrated processor chip includes a bus bridge that provides a high performance interface between an internal CPU local bus and an external PCI bus. By providing a high performance interface to an external PCI bus, relatively high performance characteristics can be achieved with respect to external data transfers.

The bus interface unit 18 provides a standard interface between the CPU local bus 14 and the peripheral or PCI bus 30. As such, the bus interface unit 18 orchestrates the transfer of data, address, and control signals between the two buses. PCI bus 30 typically comprises a high performance peripheral bus that includes multiplexed data/address lines, and which supports burst-mode data transfers. Additional features regarding the PCI bus are described in the publication "PCI Local Bus Specification," Revision 2.0, Apr. 30, 1993, PCI Special Interest Group, Hillsboro, Oreg., the details of which are incorporated by reference herein.

As set forth in Revision 2.0 of the "PCI Local Bus Specification," the PCI bus comprises a synchronous bus with a clock speed up to 33 MHz. The PCI bus clock signal typically is generated by circuitry in the bus interface unit 18 and is transmitted via a CLK line to each of the devices resident on the PCI bus. As one skilled in the art will understand, the CLK line may comprise one of the signal lines in the PCI bus 30.

Recently, the assignee of the present invention has begun to suggest modifications to the PCI Bus Specifications to permit operation of the bus at clock speeds up to 66 MHz. One problem with implementing such a high speed PCI bus is that some PCI peripheral devices, particularly those devices developed in the past, simply are not capable of operating at 66 MHz. Because of this limitation, such peripheral devices may be incapable of operation in the 66 MHz environment, and in addition, may cause the entire bus to malfunction if operated at 66 MHz. It would be desirable, therefore, to develop a system which can determine if slower (33 MHz) operating peripheral devices are resident on the PCI bus, and which can modify operation of the bus to accommodate these slower devices.

Another problem arises when a slower peripheral device is added after the high speed bus has been installed, and the operation and configuration registers of the high speed peripheral devices have been set to operate at the high clock frequency. In such a situation where a slower device is added to the bus, the bus clock speed must be reduced, and certain of the configuration registers must be reset accordingly. For example, the MAX_LAT and MIN_GNT are internal registers required in each PCI peripheral device which provide certain timing information regarding the peripheral device. MIN_GNT, for example, specifies the length of time (in 0.25 microsecond periods) that the device needs to complete its transaction. See "PCI Local Bus Specification," Revision 2.0, Apr. 30, 1993, PCI Special Interest Group, Hillsboro, Oreg. MAX_LAT specifies how often the device needs to gain access to the PCI bus (again in 0.25 microsecond periods). See id. The number of periods set in these registers will vary depending upon the operating speed of the bus. Similarly, if a slower speed peripheral device is removed from the bus, thus enabling the bus to operate at a higher clock frequency, certain registers of the high speed peripheral devices will need to be reprogrammed to operate properly at the higher speeds.

It would be advantageous if a system were developed which could determine the clock frequency, and which could change the clock frequency to the highest possible setting based upon the resident peripheral devices. It would be further advantageous if the system could automatically reset the values in the necessary registers of the peripheral devices in response to a change in clock frequency, to make the peripheral devices immediately operable, without operator input. Despite these and other readily apparent advantages of such a system, to date no such system has been developed.

SUMMARY OF THE INVENTION

The present invention solves the shortcomings and deficiencies of the prior art by providing a computer system that automatically determines whether each device resident on the PCI bus is capable of high clock frequency (such as, for example, 66 MHz) operation. If any PCI device cannot operate at the high clock frequency, the system automatically drives the PCI bus clock signal at a standard, lower clock frequency (such as, for example, 33 MHz) rate. Conversely, if every PCI device is operable at the higher clock frequency, the system operates the PCI bus clock signal at that higher frequency. In addition, in response to a change in clock frequency, the system automatically resets the values in certain registers of the PCI devices to facilitate operation at the new clock frequency.

The present invention includes a bus interface unit which orchestrates the transfer of address and data signals between the PCI bus and a CPU local bus. The bus interface unit preferably includes a clock driver, which generates the PCI bus clock signal, at a frequency dependent on the status of a high frequency enable (66 MHzENABLE in the preferred embodiment) line. The 66 MHzENABLE line is passively pulled high through a pull-up resistor. All of the devices on the PCI bus connect to the 66 MHzENABLE line (which forms part of the PCI bus), and any of these devices can drive the line low to indicate that this particular device must be operated at a lower frequency. If the 66 MHzENABLE line is driven low by any PCI device, the clock driver drives the PCI bus clock signal at a standard clock frequency, such as 33 MHz. Conversely, if none of the PCI devices drive the 66 MHzENABLE line low, then the clock driver drives the PCI bus clock signal at the higher frequency, such as 66 MHz. All 33 MHz devices will drive the 66 MHzENABLE line low because the output pin on these devices that connects to the 66 MHzENABLE line connects internally to ground.

Each of the devices resident on the PCI bus include certain configuration registers, including MIN_GNT and MAX LAT, which provide configuration parameters to various system resources. In addition, each of the devices resident on the PCI bus include a status register with a dedicated 66 MHzCAPABLE bit. The dedicated status bit indicates whether the PCI device is capable of operating in a 66 MHz environment. As a result, each device can be polled during system initialization to determine if all of the PCI devices will support 66 MHz operation. If the system determines that the clock frequency will change due to a change in the system configuration (such as PCI devices being added or removed from the PCI bus), the configuration registers of each of the PCI devices can be modified to insure proper operation at the new clock frequency.

BRIEF DESCRIPTION OF THE DRAWINGS

Other objects and advantages of the invention will become apparent upon reading the following detailed description and upon reference to the accompanying drawings in which.

Figure 1:
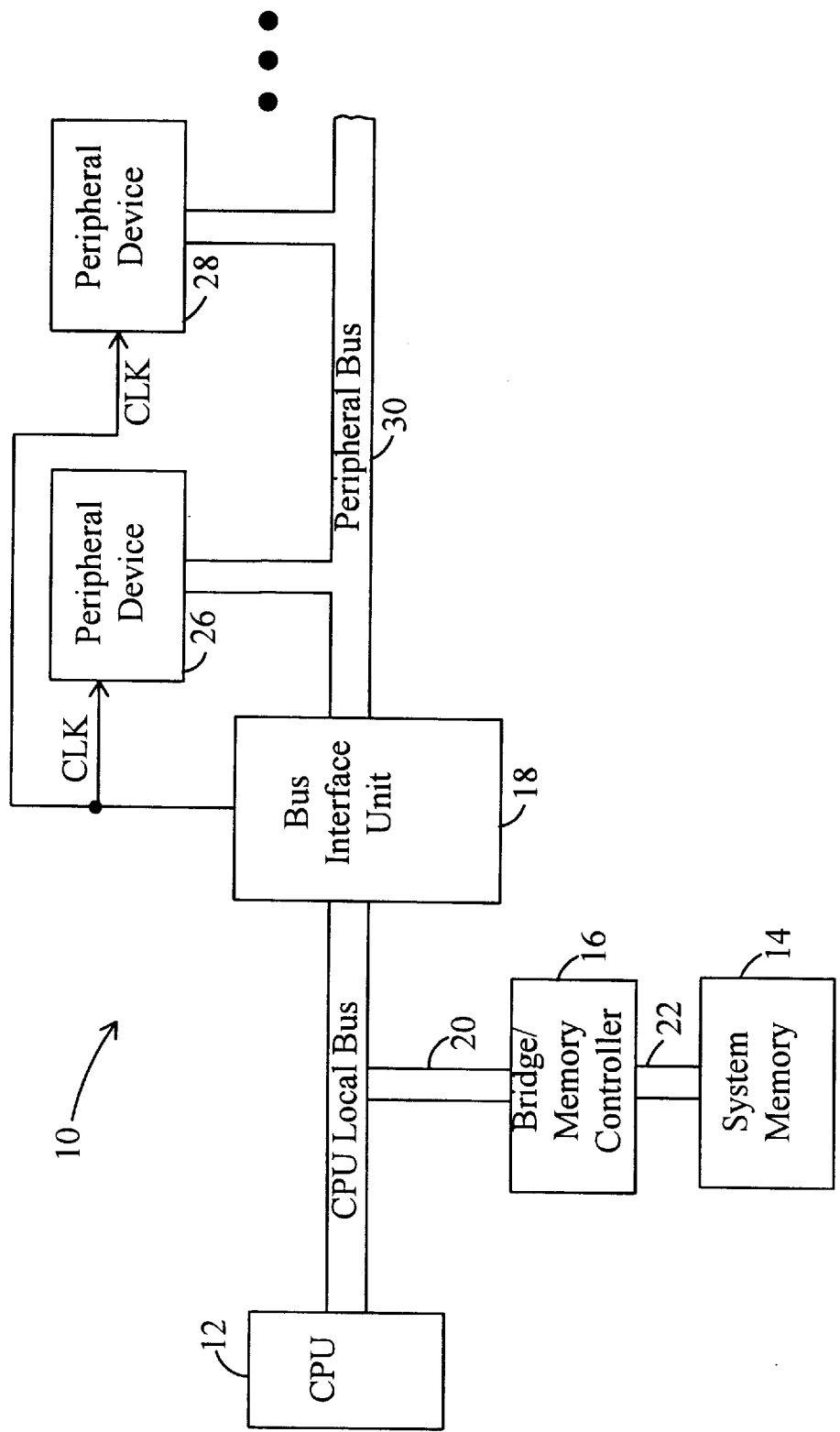
FIG. 1 depicts a prior art computer system implementing a peripheral bus system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 2:
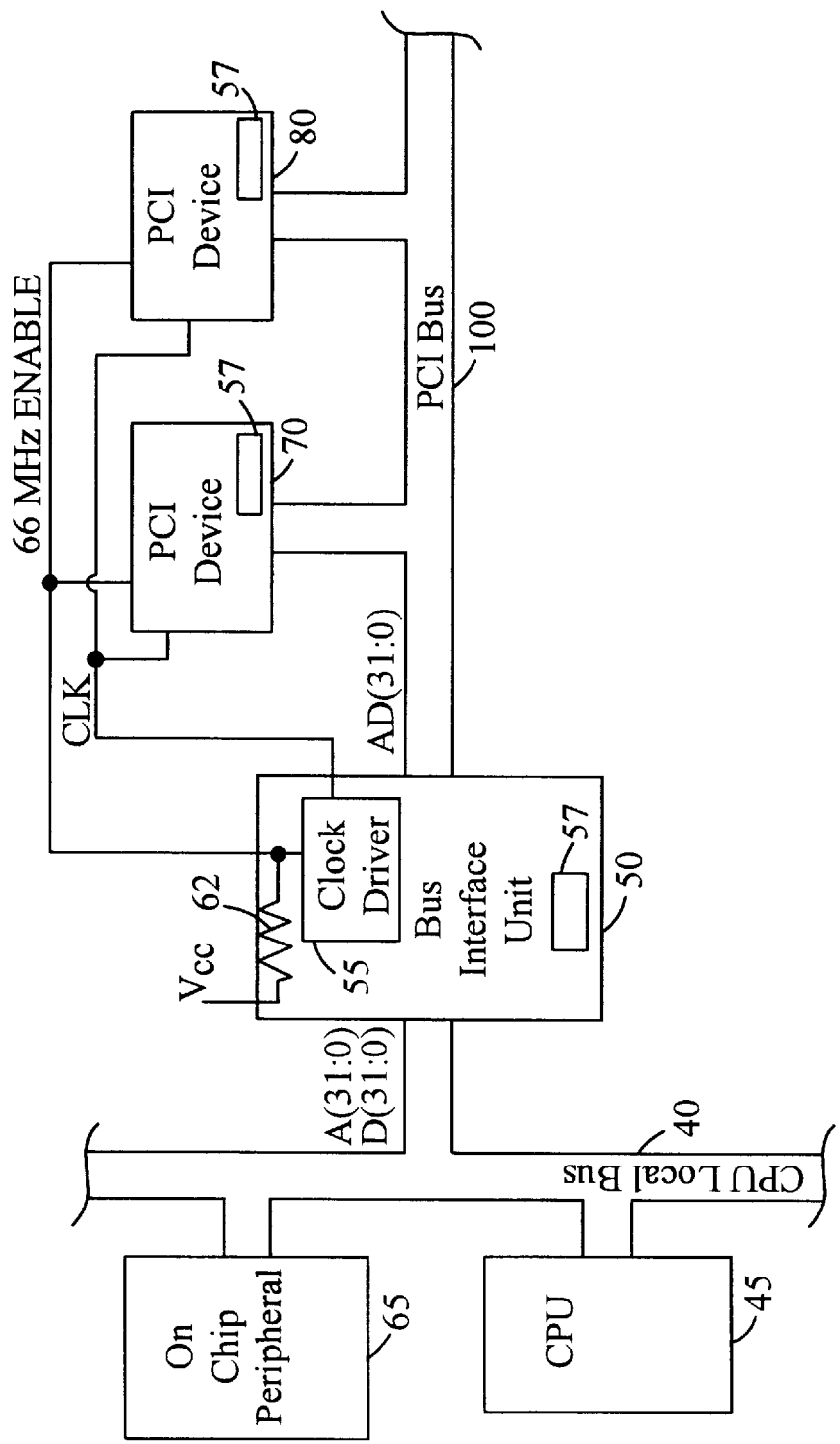
FIG. 2 shows a computer system implementing a PCI bus system constructed in accordance with the preferred embodiment of the present invention.

Referring now to FIG. 2, a computer system constructed in accordance with the preferred embodiment generally comprises a central processing unit 45 connected to a CPU local bus 40, an on chip peripheral device 65, a PCI bus 100, a bus interface unit 50 capable of interfacing data, address, and control signals between the local bus 40 and the PCI bus 100, and one or more peripheral devices 70, 80 connected to the PCI bus 100. In the preferred embodiment, the CPU 45, on chip peripheral 65 and bus interface unit 50 all are provided as part of an integrated processor that is fabricated on a single integrated circuit and housed within a common integrated circuit package.

In the preferred embodiment, the CPU core 45 implements a model 80486 microprocessor instruction set and CPU local bus 40 comprises a model 80486-style local bus. Thus, in the preferred embodiment, the CPU local bus 40 includes a 32-bit set of data lines D[31:0], a 32-bit set of address lines A[31:0], and a set of control lines (not shown specifically). It should be understood, however, that the CPU core 45 could be configured to implement other microprocessor-type instruction sets without departing from the principles of the present invention.

The on-chip peripherals block 65 preferably represents a variety of peripheral devices that may be implemented in the integrated processor. For example, components such as a direct memory access controller ("DMA") or a memory controller unit ("MCU") may be included as an integral part of the integrated processor package. As one skilled in the art will understand, various peripherals may be provided as part of the integrated processor.

As will be understood by one skilled in the art, the bus interface unit ("BIU") 50 provides a standard interface between the CPU local bus 40 and the PCI bus 100. As such, the BIU 50 orchestrates the transfer of data, address, and control signals between the CPU local bus 40 and PCI bus 100. As noted, the CPU local bus 40 preferably comprises an 80486 style local bus, which as is well known to those skilled in the art, includes separate address and data lines, while the PCI bus 100 includes a plurality of multiplexed address/data lines AD(31:0). Thus, as one skilled in the art will understand, the BIU 50 preferably functions to connect the 32-bit address lines A[31:0] of the local bus 40 to the multiplexed address/data lines AD(31:0) on the PCI bus 100, through an appropriate multiplexing unit (not shown). Similarly, the bus interface unit 50 directly connects the 32-bit data lines D[31:0] of the local bus 65 to the multiplexed address/data lines AD[31:0] of the PCI bus 100. The bus interface unit 50 preferably includes conventional circuitry that controls well known interfacing functions such as orchestrating and transferring control, data, and address signals between microprocessor 45 and devices coupled to PCI bus 100.

Referring still to the preferred embodiment of the invention shown in FIG. 2, the bus interface unit 50 preferably includes a clock driver circuit 55 and a status register 57. The clock driver 55 generates a PCI bus clock signal which is provided on a CLK line to each of the devices resident on the PCI bus 100 to drive the PCI peripheral devices 70, 80. In addition, clock driver 55 preferably connects to a high frequency enable line (referred to in the preferred embodiment as 66 MHzENABLE).

The 66 MHzENABLE line connects to each of the PCI devices on a designated PCI connector pin. Preferably, the PCI connector pin comprises pin 49, side B, which on 33 MHz devices is bused as a ground. In high frequency devices (which in the preferred embodiment is any device operable above 33 MHz, and is referred to as 66 MHz devices), the 66 MHzENABLE line is left floating (i.e., tri-stated). Thus, if all devices are high-frequency devices, the 66 MHzENABLE line is passively pulled high through a pull-up resistor 62. If any devices are low speed devices (such as devices operating at 33 MHz or less, referred to herein as 33 MHz devices), the 66 MHzENABLE line is pulled low. As a result of this configuration, the 66 MHzENABLE line will be asserted if all of the PCI devices comprise 66 MHz compatible devices, but will be deasserted if any of the PCI devices comprises a 33 MHz device.

As one skilled in the art will realize, the 66 MHzENABLE line and the CLK line may be provided as part of the PCI bus 100. These lines have been shown separate from the PCI bus 100 in FIG. 2 only for the sake of clarity.

The status register 57 preferably comprises a 16-bit register, although other size registers can be used without departing from the principles of the present invention. In the preferred embodiment, the status register 57 includes a dedicated bit (which preferably is bit 6) that indicates if that particular device is capable of supporting 66 MHz operation.

Referring still to FIG. 2, two PCI peripheral devices 70, 80 are shown. It should be understood, however, that more or less peripheral devices may be used, as desired and as permitted by the system specifications. Each of the peripheral devices 70, 80 preferably includes a status register 57, constructed and configured similarly to the status register of the BIU 50. In addition, each of the peripheral devices 70, 80 connects to the PCI bus 100 and to the CLK and 66 MHzENABLE lines, respectively.

Figure 3:
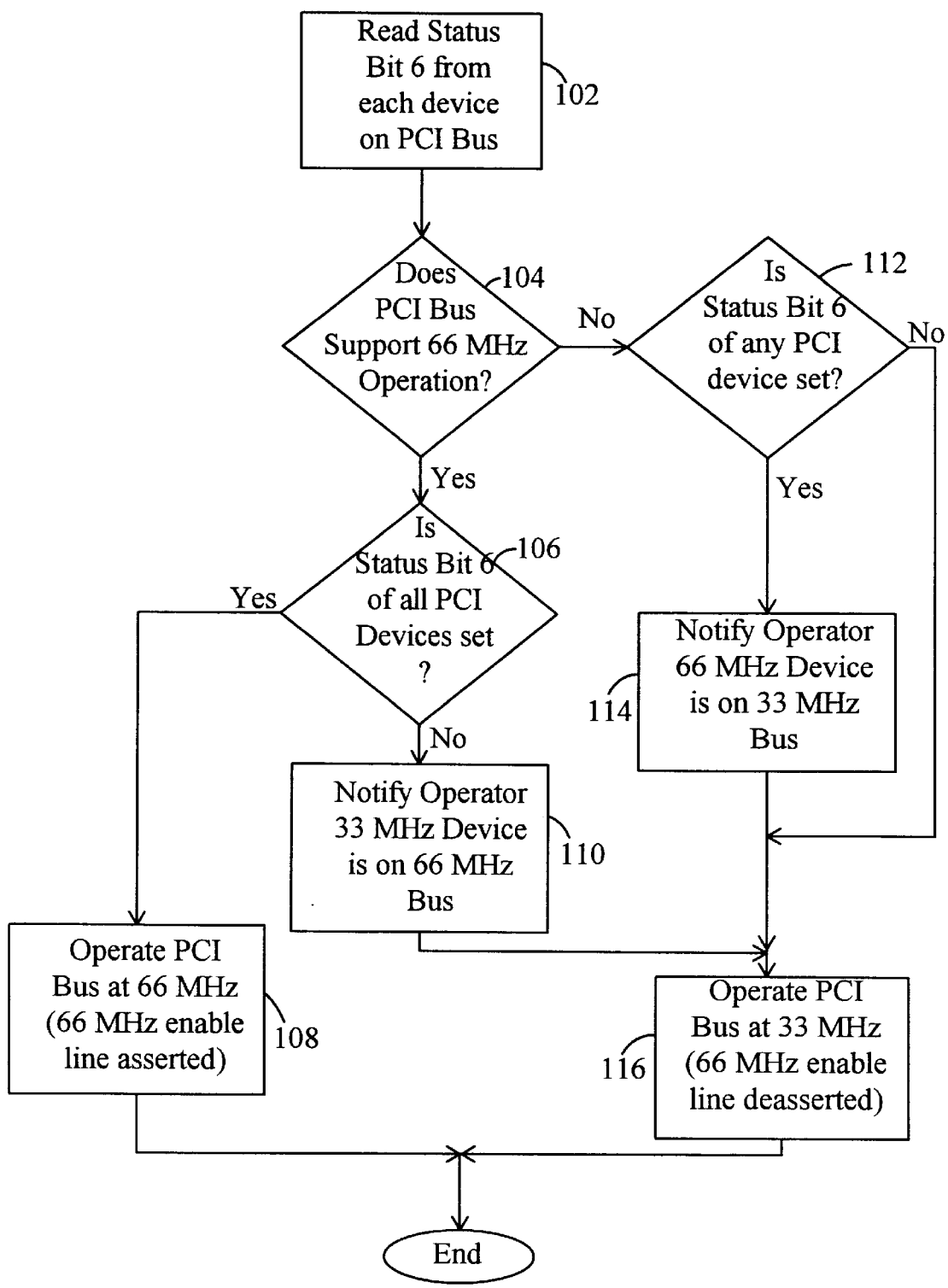
FIG. 3 is a flow chart depicting operation of the PCI bus system of FIG. 2.
Figure 4:
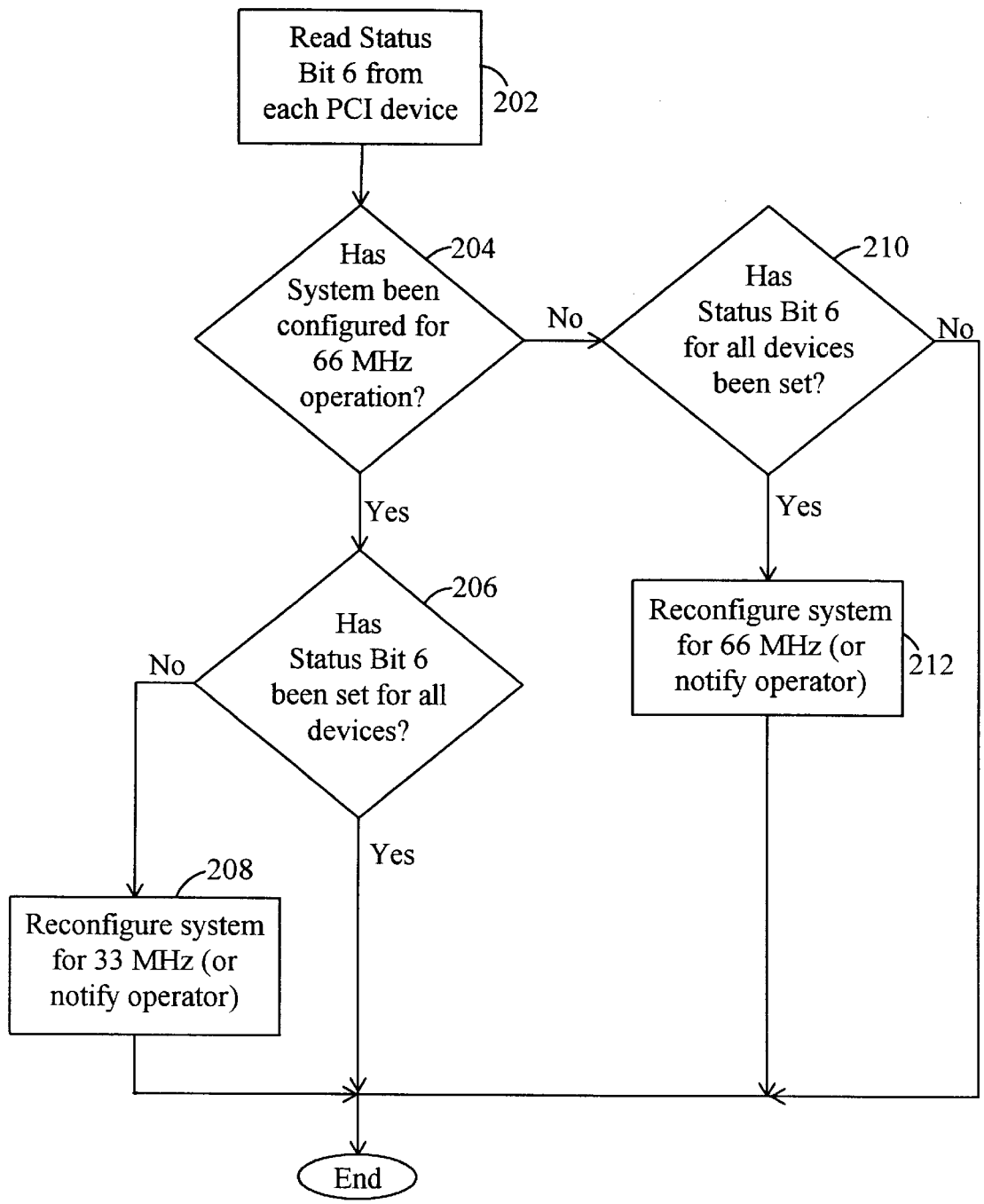
FIG. 4 is a flow chart illustrating an automatic configuration mode for the PCI bus system of FIG. 2.

The operation of the system will now be described with reference to FIGS. 2, 3 and 4. Referring initially to FIG. 2, each of the devices residing on the PCI bus 100, including the bus interface unit 50 and the PCI peripheral devices 70, 80, connect to the 66 MHzENABLE line. If a device cannot support 66 MHz operation, the 66 MHzENABLE line is connected internally to a ground. Devices which can support 66 MHz operation do not drive the 66 MHzENABLE line. Thus, the 66 MHzENABLE line will be passively pulled high through pull-up resistor 62 if all devices support 66 MHz operation.

The clock driver 55 connects to the 66 MHzENABLE line to check the status of that line. If the 66 MHzENABLE line is asserted (i.e., pulled high), then the clock driver 55 drives the PCI bus clock signal at a frequency up to 66 MHz. Conversely, if the 66 MHzENABLE line is deasserted (i.e., drive low), the clock driver 55 drives the PCI bus clock signal at a frequency up to 33 MHz. Thus, in the preferred embodiment, the speed at which the PCI bus clock signal is driven by clock driver 55 is dependent on the status of the 66 MHzENABLE line.

The present invention also provides a technique for detecting incompatibility between PCI peripheral devices and the PCI bus, and for notifying the operator regarding these conditions so that the operator can make modifications to the system to maximize system capabilities. Referring now to FIG. 3, the system (for example, the CPU 45 or BIU 50) in step 102 reads the dedicated status bit from each of the devices resident on the PCI bus. The dedicated status bit preferably comprises bit 6 of the status register 57 from each PCI device. Next, in step 104, the system determines if the PCI bus can support 66 MHz operation. If so, then the system determines in step 106 whether the dedicated status bit has been set for all of the PCI devices, indicating that all of the devices resident on the PCI bus can support 66 MHz operation. If all of the devices can operate at 66 MHz, and if the PCI bus can operate at 66 MHz, then the PCI bus is operated at frequencies up to 66 MHz (step 108), which according to the preferred embodiment is implemented automatically based upon the hardware configuration of FIG. 2.

If the PCI bus is operable at 66 MHz, but the system determines in step 106 that at least one of the dedicated status bits indicate that a device on the PCI bus cannot support 66 MHz operation, then in step 110 the operator is notified that a 33 MHz device is located on the 66 MHz PCI bus. Identification of the particular device may also be provided. This notification permits the operator to remove the 33 MHz device from the PCI bus to minimize latency and increase bandwidth of the bus. As shown in step 116, the PCI bus is operated at 33 MHz, which in the preferred embodiment, will be implemented automatically based upon the hardware configuration of FIG. 2.

If it is determined in step 104 that the PCI bus is incapable of 66 MHz operation, then in step 112 the system determines if any of the dedicated status bits have been set to indicate a 66 MHz device. If none of the dedicated status bits have been set, then the PCI bus is operated at 33 MHz (step 116). If conversely, one or more of the dedicated status bits are set, then in step 114 the operator is notified that a 66 MHz device is resident on the 33 MHz bus to permit the operator to use a less expensive device if desired, and the bus is operated at 33 MHz (step 116).

The present invention also implements a technique for automatically modifying configuration registers of the PCI devices based upon a change in the devices resident on the PCI bus. The preferred method of implementing this technique is shown in FIG. 4, and is performed each time the system is initialized. In step 202, the system (for example, the CPU 45 or BIU 50) reads the dedicated status bit (preferably bit 6) from each of the devices resident on the PCI bus. In step 204, a check is made to determine if the PCI system is presently configured for 66 MHz operation. If the system is configured for 66 MHz operation, then the dedicated status bit of all PCI devices is checked in step 206 to determine if all of the dedicated status bits are still set. If so, no changes are made and the subroutine terminates. If, however, it is determined that at least one of the dedicated status bits is not set, then the system in step 208 will reconfigure the system for 33 MHz operation. This preferably includes redefining the time periods set in the MIN_GNT and MAX_LAT registers. Alternatively, the system could simply provide a notification to the operator that these and other registers need to be redefined based upon a change in the PCI bus clock frequency.

If in step 204 it is determined that the system has not been configured for 66 MHz operation, then in step 210 the system determines whether the dedicated status bits now have all been set to indicate that operation at 66 MHz is now possible. If all of the dedicated status bits are not set, then the subroutine terminates. Conversely, if all of the dedicated status bits are now set, then in step 212 the system reconfigures the PCI devices for 66 MHz operation. This preferably includes redefining the time periods set in the MIN_GNT and MAX_LAT registers. Alternatively, the system could simply provide a notification to the operator that these and other registers need to be redefined based upon a change in the PCI bus clock frequency.

While a preferred embodiment of the invention has been shown and described, modifications thereof can be made by one skilled in the art without departing from the spirit of the invention. For example, the preferred embodiment characterizes low clock signal frequency as 33 MHz, and high clock signal frequency as 66 MHz. It should be understood that the principles of the present invention are applicable to any peripheral bus system which is operable generally at a low and a high frequency clock, regardless of the particular frequency rates. In addition, it is noted that 66 MHz devices may be completely disconnected from the 66 MHzENABLE line. Similarly, while 33 MHz devices are configured to drive the 66 MHzENABLE line low in the preferred embodiment, the system could be alternatively configured such that 33 MHz devices drive an enable line (which is normally passively pulled low) high.

What is claimed is:

1. A computer system, comprising:

a central processing unit connected to a local bus;

a peripheral bus;

a bus interface unit coupled to said local bus and to said peripheral bus for orchestrating the transfer of data and address signals between said local bus and said peripheral bus;

one or more peripheral bus devices coupled to said peripheral bus; and a clock driver connected to said peripheral bus for driving a peripheral bus clock signal at a peripheral bus clock signal frequency based upon the capabilities of the peripheral bus, said bus interface unit and said one or more peripheral bus devices;

wherein said bus interface unit and said one or more peripheral bus devices each include a status register with a dedicated bit to indicate an ability to accommodate a high peripheral bus clock signal frequency; and wherein each of said one or more peripheral bus devices includes a MIN_GNT register and a MAX_LAT register, wherein said MIN_GNT register specifies the length of time that said peripheral bus device requires to complete a peripheral bus transaction, wherein said MAX_LAT register specifies how often said peripheral bus device needs to gain access to said peripheral bus, and wherein the parameters of these registers are modified in anticipation of a change in the peripheral bus clock signal frequency.

2. The computer system of claim 1, wherein said bus interface unit is configured to determine whether said computer system has been configured to operate said peripheral bus with said high peripheral bus clock signal frequency.

3. The computer system of claim 2, wherein said bus interface unit is configured to read said dedicated bit from each of said one or more peripheral bus devices.

4. The computer system of claim 3, wherein said bus interface unit is configured to determine whether all of said one or more peripheral bus devices indicate an ability to accommodate said high peripheral bus clock signal frequency by comparing said dedicated bits.

5. The computer system of claim 4, wherein said bus interface unit is configured to modify said MIN_GNT registers and said MAX_LAT registers in response to (a) an affirmative determination that said computer system has been configured to operate said peripheral bus with said high peripheral bus clock signal frequency, and (b) a determination that not all of said one or more peripheral bus devices indicate an ability to accommodate said high peripheral bus clock signal frequency.

6. The computer system of claim 5, wherein said clock driver drives said peripheral bus clock signal with a low peripheral bus clock signal frequency subsequent to modification of said MIN_GNT registers and said MAX_LAT registers.

7. The computer system of claim 4, wherein said bus interface unit is configured to modify said MIN_GNT registers and said MAX_LAT registers in response to (a) a determination that said computer system has not been configured to operate said peripheral bus with said high peripheral bus clock signal frequency, and (b) an affirmative determination that all of said one or more peripheral bus devices indicate an ability to accommodate said high peripheral bus clock signal frequency.

8. The computer system of claim 7, wherein said clock driver drives said peripheral bus clock signal with said high peripheral bus clock signal frequency subsequent to said modification of said MIN_GNT registers and said MAX_LAT registers.

9. A method for reconfiguring one or more PCI bus devices coupled to a bus interface unit through a PCI bus in anticipation of a change in PCI bus clock signal frequency, the method comprising:

determining a first PCI bus clock signal frequency at which said PCI bus has previously been operating;

determining whether each of said one or more PCI bus devices is configured to accommodate a high PCI bus clock signal frequency; and reconfiguring configuration registers in said one or more PCI bus devices to enable said one or more PCI bus devices to operate at said high PCI bus clock signal frequency in response to (a) a determination that said first PCI bus clock signal frequency is not equal to said high PCI bus clock signal frequency, and (b) a determination that all of said one or more PCI bus devices is configured to accommodate said high PCI bus clock signal frequency.

10. The method of claim 9, further comprising:

reconfiguring said configuration registers in said one or more PCI bus devices to enable said one or more PCI bus devices to operate at a low PCI bus clock signal frequency in response to (a) a determination that said first PCI bus clock signal frequency is equal to said high PCI bus clock signal frequency, and (b) a determination that not all of said one or more PCI bus devices are configured to accommodate said high PCI bus clock signal frequency.

11. The method of claim 10, wherein the configuration registers includes a MIN_GNT register and a MAX_LAT register configured with each of said one or more PCI bus devices, wherein said MIN_GNT register specifies the length of time that said PCI bus device requires to complete a PCI bus transaction, wherein said MAX_LAT register specifies how often said PCI bus device needs to gain access to said PCI bus.

12. The method of claim 9, wherein said high PCI bus clock signal frequency is 66 MHz, and said low PCI bus clock signal frequency is 33 MHz.

13. The method of claim 12, wherein each of said one or more PCI bus devices indicates an ability to accommodate said high PCI bus clock signal frequency by a dedicated status bit configured within said PCI bus device.

14. The method of claim 12, wherein said determining whether each of said one or more PCI bus devices is configured to accommodate a high PCI bus clock signal frequency is performed after the removal of a 33 MHz PCI device from the PCI bus.

* * * * *